G. W. BROWN.
Corn-Planter.
No. 1,037
Reissued Sept. 11, 1860.
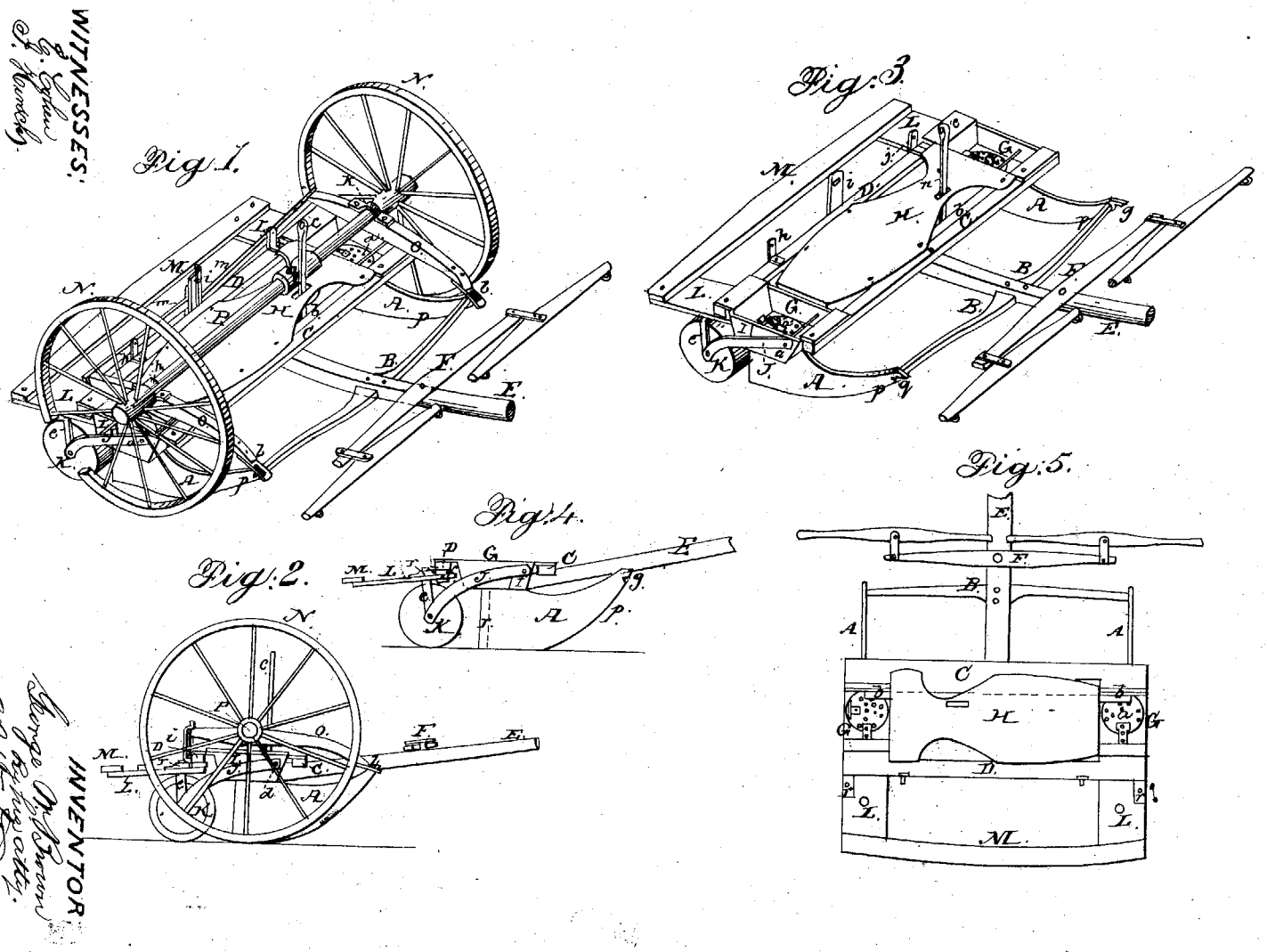
WITNESSES:
E. Cohen
F. Hunsche
INVENTOR:
George W. Brown
By his atty.
A. B. Stoughton
N. PETERS, PHOTO-LITHOGRAPHER, WASHINGTON, D. C.

UNITED STATES PATENT OFFICE.

GEORGE W. BROWN, OF GALESBURG, ILLINOIS.

IMPROVEMENT IN SEED-PLANTERS.

Specification forming part of Letters Patent No. 9,893, dated February 2, 1853; Reissue No. 526, dated February 16, 1858; Reissue No. 1,037, dated September 11, 1860.

*To all whom it may concern:*

Be it known that I, GEORGE W. BROWN, of Galesburg, in the county of Knox and State of Illinois, have invented certain new and useful Improvements in Seed-Planters; and I do hereby declare the following to be a full, clear, and exact description of the same, reference being had to the accompanying drawings, making a part of this specification, in which—

Figure 1 represents a perspective view of my seed-planting machine arranged for automatic or "machine" dropping, as it is termed. Fig. 2 represents a side elevation of the same. Fig. 3 represents the same machine arranged for hand-dropping. Fig. 4 represents a side elevation, and Fig. 5 a top plan, of the machine as arranged for hand-dropping, as shown in Fig. 3.

Similar letters of reference, where they occur in the several figures, denote corresponding parts of the machine in all the drawings.

In opening up a furrow in the ground, into which corn is to be dropped from a machine, an instrument is required which should have three prerequisites: First, it must incline upward at its front edge, so as to climb up and over or cut or break through such intervening obstacles as are usually met with in planting corn; second, it must be capable of opening a furrow without much lateral displacement of the soil, as it requires much power to do so, and, besides, the soil, if mucky, as it is apt to be at the season of the year when corn is planted, will cling to the furrow-opener, and thus, instead of a clear, smooth gash, the furrow is rough and uneven; third, it must glide through the soil more like cutting with a knife than tearing it apart, and thus prevent any clinging of soils thereto, and keeping itself smooth and bright; and, fourth, it must be long enough to form a support for the frame to be carried by it. Such an instrument for such purpose I have devised; and the nature of this invention may be stated as follows, viz: the construction and use, in connection with a corn-planting machine, of a runner or shoe preceding a planting device, said runner or shoe being made with an upward inclining edge, and the point thereof sufficiently high or raised that it will climb up and over or cut or break through intervening obstacles without materially forcing the earth in a lateral direction at its front part, but widening toward its rear end, so as to open out a gash or furrow, in which to deposit the seed, as will be explained.

The shoe or runner A is made thin enough to easily penetrate the ground at its lower edge, and has an upward-inclining edge, *p*, which rises high enough to climb over or break or cut through any ordinary intervening obstacle, such as clods, stalks, or sod. It is thin enough so as not to be required to force the earth materially in a lateral direction, and keeps bright and smooth. It widens out gradually toward its rear end, so as to open a gash or furrow for the seed to drop into. I prefer to make the seed duct or tube *r* in the rear of the shoe or runner itself, so that the runner will be certain to hold open the furrow it makes until the seeds are dropped into it. The seed-duct *r* should at least follow the furrow-opener close enough to prevent the earth from running into and filling the gash or furrow before the seeds are deposited in it. A runner or shoe thus made causes but little friction in passing through the earth or soil, and as it is thin and smooth the muck does not cling to it and choke it up, as it would do were it of a wedge form with a vertical edge and thick rear, which must force the earth laterally to a great extent. The manner of connecting such shoes or runners with a seeding-machine is fully shown by the drawings. Their length must be sufficient to support the frame that is to be carried by them without being forced too deep into the soil, as would be the case with a sword-shaped cutter.

Having thus fully described the nature and object of my invention, what I claim under this patent is—

The construction of a shoe or runner for seed-planting machines with an upward-inclining edge, and its point sufficiently high or raised as that it will climb up and over or cut or break through intervening obstacles without materially forcing the earth laterally at its front part, and widening toward its rear end, so as to open out a gash or furrow, in which the seed to be planted may be deposited, and long enough to furnish a support to the framework, substantially as described.

GEO. W. BROWN.

Witnesses:

A. B. STOUGHTON,

E. COHEN.